(12) United States Patent
Lu et al.

(10) Patent No.: US 11,971,623 B2
(45) Date of Patent: Apr. 30, 2024

(54) DISPLAY SCREEN, DISPLAY DEVICE AND METHOD FOR MANUFACTURING DISPLAY SCREEN

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventors: Huajun Lu, Guangdong (CN); Juncheng Xiao, Guangdong (CN); Hongyuan Xu, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 93 days.

(21) Appl. No.: 17/623,911

(22) PCT Filed: Dec. 22, 2021

(86) PCT No.: PCT/CN2021/140573
§ 371 (c)(1),
(2) Date: Dec. 30, 2021

(87) PCT Pub. No.: WO2023/108767
PCT Pub. Date: Jun. 22, 2023

(65) Prior Publication Data
US 2023/0185126 A1    Jun. 15, 2023

(30) Foreign Application Priority Data
Dec. 14, 2021 (CN) .......................... 202111528353.5

(51) Int. Cl.
*G02F 1/1335* (2006.01)
*F21S 4/28* (2016.01)
(Continued)

(52) U.S. Cl.
CPC .......... *G02F 1/133553* (2013.01); *F21S 4/28* (2016.01); *G02F 1/13336* (2013.01); *F21Y 2115/10* (2016.08)

(58) Field of Classification Search
CPC .. G02F 1/133553; G02F 1/13336; F21S 4/28; F21Y 2115/10
See application file for complete search history.

(56) References Cited

U.S. PATENT DOCUMENTS

2015/0338065 A1* 11/2015 Wang ................ G02F 1/133603
362/97.1
2021/0151422 A1* 5/2021 Iguchi .................. H01L 25/167

FOREIGN PATENT DOCUMENTS

| CN | 109375410 A | 2/2019 |
| CN | 110187568 A | 8/2019 |

(Continued)

OTHER PUBLICATIONS

Chinese Office Action issued in corresponding Chinese Patent Application No. 202111528353.5 dated Feb. 1, 2024, pp. 1-8.

*Primary Examiner* — Anne M Hines
*Assistant Examiner* — Jose M Diaz
(74) *Attorney, Agent, or Firm* — Rivka Friedman

(57) ABSTRACT

According to an embodiment of the present disclosure, a display screen, a display device, and a method for manufacturing the display screen are disclosed. The display screen includes a display panel and a light bar. The light bar includes an array substrate and a plurality of light emitting elements, and a first gap is provided between two adjacent light emitting elements. A reflecting wall is arranged in the (Continued)

first gap between at least two adjacent light emitting elements. By arranging the reflecting wall, the side light of the light emitting elements can be reflected upwards, thereby reducing an emission angle of the light bar.

18 Claims, 4 Drawing Sheets

(51) Int. Cl.
*F21Y 115/10* (2016.01)
*G02F 1/1333* (2006.01)

(56) References Cited

FOREIGN PATENT DOCUMENTS

| CN | 110970546 A | 4/2020 |
| CN | 112133734 A | 12/2020 |
| CN | 112151567 A | 12/2020 |
| CN | 212516414 U | 2/2021 |
| CN | 112786760 A | 5/2021 |
| CN | 114242874 A | 3/2022 |

* cited by examiner

DISPLAY SCREEN, DISPLAY DEVICE AND METHOD FOR MANUFACTURING DISPLAY SCREEN

FIELD OF THE DISCLOSURE

The present disclosure relates to a field of display, and more particularly, to a display screen, a display device, and a method for manufacturing the display screen.

BACKGROUND

With the gradual growth of the splicing market scale, a splicing display screen is gradually favored because of its price advantage. To improve the display effect of the display screen, at present, it is often used to attach a light bar on a display panel of the display screen to eliminate the black edge phenomenon on the display panel. However, due to the large difference between an emission angle of the light bar and an emission angle of the display panel, the luminous effect of the light bar and the luminous effect of the display panel is different, thereby affecting the overall display effect of the display screen.

SUMMARY

An embodiment of the present disclosure provides a display screen, a display device and a method for manufacturing the display screen to solve the problem of the large difference between an emission angle of the light bar and an emission angle of the display panel in the display screen.

An embodiment of the present disclosure provides a display screen. The display screen comprises a display panel and a light bar attached on a display surface of the display panel. The light bar includes an array substrate, a reflecting wall, and a plurality of light emitting elements arranged on the array substrate. The reflecting wall is arranged on the array substrate and positioned in a first gap between two adjacent light emitting elements.

By arranging the reflecting wall in the first gap between at least two adjacent light emitting elements, the side light of the corresponding light emitting elements can be reflected upwards, thereby reducing an emission angle of the light bar. The compatibility between the emission angle of the light bar and the emission angle of the display panel is increased, thereby increasing the overall display effect of the display screen.

Optionally, in some embodiments of the present disclosure, the display screen comprises at least two display panels, a splicing slit exists between the two display panels, and the light bar covers the splicing slit.

By splicing the display panels, it can avoid the increase of manufacturing difficulty caused by the excessive size of a single display panel. At the same time, the splicing of the display panels can also meet the different requirements of the display screen for size, shape, display effect, etc., so as to expand the application range of the display screen. Using the light bar to cover the splicing slit can effectively make up for the displayed picture at the splicing slit.

Optionally, in some embodiments of the present disclosure, the display screen comprises a plurality of display panels, and the light bar covers the splicing slit between any two adjacent display panels.

By using the bar light to cover the splicing slit between any two adjacent display panels, the displayed picture at any splicing slit can be further made up to ensure the display integrity of the whole display screen.

Optionally, in some embodiments of the present disclosure, the reflecting wall is arranged in the first gap between any two adjacent light emitting elements.

By arranging the reflecting wall in the first gap between any two adjacent light emitting elements, the side light of each of the light emitting elements is reflected upwards. Further, the emission angle of the whole light bar is reduced. The compatibility between the emission angle of the light bar and the emission angle of the display panel is increased, thereby improving the overall display effect of the display screen.

Optionally, in some embodiments of the present disclosure, the reflecting wall is disposed on an edge of the light bar.

B y arranging the reflecting wall on an edge of the light bar, it is convenient to reflect the light emitted from each side of the light-emitting element, so as to prevent the light-emitting element at the edge of the light bar from affecting the overall light-emitting angle of the light bar.

Optionally, in some embodiments of the present disclosure, the light bar comprises a plurality of light emitting units, each of the light emitting units comprises the light emitting elements, and a second gap is provided between two adjacent light emitting units. The reflecting wall is arranged in the second gap between at least two adjacent light emitting units.

The light emitting elements are divided by the light emitting units, so that the light emitted by the light emitting elements in one light emitting unit can be mixed first, and then mixed with the light emitted by other light emitting units. The reflecting wall is used to reflect the side light of the light emitting units to meet the different luminous requirements of the light bar.

Optionally, in some embodiments of the present disclosure, the reflecting wall is arranged in the second gap between any two adjacent light emitting units.

By arranging the reflecting wall in the second gap between any two adjacent light emitting units, the side light of each of the light emitting units is reflected upwards, so as to further reduce the emission angle of the whole light bar. The compatibility between the emission angle of the light bar and the emission angle of the display panel is increased, thereby improving the overall display effect of the display screen.

Optionally, in some embodiments of the present disclosure, a height of the reflecting wall in relative to the array substrate is greater than a height of the light emitting element in relative to the array substrate.

This structural design can ensure the effective reflection of the reflecting wall to the side light of the light emitting elements, so as to achieve the compatibility between the emission angle of the light bar and the emission angle of the display panel, thereby improving the overall display effect of the display screen.

Optionally, in some embodiments of the present disclosure, a height difference between the reflecting wall and the light emitting element is greater than or equals to 30% of the height of the light emitting element. A height difference between the reflecting wall and the light emitting element is less than or equal to 50% of a height of the light emitting element.

This structural design can not only ensure the effective reflection of the reflecting wall to the side light of the light emitting elements, but also avoid the excessive reflection of the reflecting wall to the side light of the light emitting elements, thereby increasing the compatibility between the luminous efficiency of the light bar and the luminous efficiency of the display panel.

Optionally, in some embodiments of the present disclosure, a third gap is provided between the reflecting wall and the adjacent light emitting element. A width of the third gap is less than or equal to 35% of a width of the first gap. The width of the third gap is greater than or equal to 15% of the width of the first gap.

This structural design can not only ensure the effective reflection of the reflecting wall to the side light of the light emitting elements, but also avoid the excessive reflection of the reflecting wall to the side light of the light emitting elements, thereby increasing the compatibility between the luminous efficiency of the light bar and the luminous efficiency of the display panel.

Optionally, in some embodiments of the present disclosure, a refractive index of the reflecting wall is greater than or equals to 1.7.

By selecting the reflecting wall with a refractive index of the reflecting wall is greater than or equals to 1.7, the light can hardly pass through the reflecting wall and is completely reflected to the front of the light-emitting element, thereby achieving total reflection of the reflecting wall.

Optionally, in some embodiments of the present disclosure, the reflecting wall is made of metal.

Selecting metal materials as the reflecting wall can ensure that the light is completely reflected when it hits the surface of the reflecting wall, effectively reducing the angle of the light-emitting element, while avoiding the loss of the emitted light inside the reflecting wall, and improving the luminous intensity of the light-emitting element.

Optionally, in some embodiments of the present disclosure, an emission angle of the light bar is less than or equal to 120°.

By means of setting the emission angle of the light bar to be within 120°, it can ensure the basic compatibility between the emission angle of the light bar and the emission angle of the display panel, so as to achieve the improvement to the display effect of the display screen.

Optionally, in some embodiments of the present disclosure, a difference between an emission angle of the light bar and an emission angle of the display panel is less than or equal to 20°.

By means of setting the difference between the emission angle of the light bar and the emission angle of the display panel to be less than or equal to 20°, it can further limit the relationship between the emission angle of the light bar and the emission angle of the display panel, so as to meet the requirements of the overall display effect of the display screen.

Optionally, in some embodiments of the present disclosure, the light bar further comprises a light transparent layer, and the light transparent layer is located on the light emitting elements.

On one hand, the arrangement of the light transparent layer can carry out the packaging protection to the multiple light emitting elements to avoid the erosion of oxygen or moisture in the air to the light emitting elements. On the other hand, while ensuring the normal luminescence of the surface of the light emitting elements, it can also flatten the surface of the reflecting wall and the multiple light emitting elements, thereby increasing the overall beauty of the light bar.

Optionally, in some embodiments of the present disclosure, a material of the light transparent layer is one or more selected from a group of silica gel, epoxy resin, and silicone resin.

The light transparent layer of this group of materials can not only ensure the packaging protection to the light emitting elements, but also avoid to affect the normal luminescence of the light emitting elements.

Accordingly, an embodiment of the present disclosure also provides a display device. The display device comprises the display screen described in any of the above contents.

Accordingly, an embodiment of the present disclosure also provides a method for manufacturing the display screen. The method comprises: providing an array substrate; forming a plurality of light emitting elements on the array substrate, and providing a first gap between two adjacent light emitting elements; forming a reflecting wall on the array substrate so that the reflecting wall is located in the first gap between at least two adjacent light emitting elements to form a light bar; providing a display panel; and attaching the array substrate of the light bar on a display surface of the display panel.

By forming the reflecting wall in the first gap between two adjacent light emitting elements in the manufacturing process of the display screen, so as to carry out the reflection to the side light of the light emitting elements, the emission angle of the light emitting elements is reduced, thereby reducing the emission angle of the whole light bar. It ensures the compatibility between the emission angle of the light bar and the emission angle of the display panel. Further, the display effect of the display screen is improved.

Optionally, in some embodiments of the present disclosure, the step of forming the reflecting wall on the array substrate comprises: coating a transparent layer on the array substrate and the plurality of light emitting elements; etching the transparent layer at an area aligning the first gap to form a first trench; and forming the reflecting wall on the first trench.

By means of forming the transparent layer, and then forming the reflecting wall on the first trench defined on the transparent layer, it is convenient for adjusting the position of the reflecting wall. In addition, the light-emitting elements are effectively packaged by the transparent layer to improve the stability of the light bar.

Optionally, in some embodiments of the present disclosure, the step of forming the reflecting wall on the array substrate comprises: forming the reflecting wall on the array substrate and the plurality of light emitting elements; etching the reflecting wall at an area aligning the plurality of light emitting elements to form a second trench; and forming the transparent layer on the second trench.

By means of forming the reflecting wall, and then forming the transparent layer on the second trench defined on the reflecting wall, the light-emitting element emits light only through the surface upward. It is beneficial to reduce the light-emitting angle of the light-emitting element and improve the light utilization rate of the light-emitting element.

According to an embodiment of the present disclosure, a display screen is disclosed. The display screen comprises a display panel and a light bar. The light bar is attached on a display surface of the display panel. The light bar comprises an array substrate and a plurality of light emitting elements arranged on the array substrate, and a first gap is provided between two adjacent light emitting elements. The light bar further comprises a reflecting wall arranged on the array substrate, and the reflecting wall is arranged in the first gap between at least two adjacent light emitting elements. By arranging the reflecting wall in the first gap between at least two adjacent light emitting elements, the side light of the corresponding light emitting elements can be reflected upwards, thereby reducing an emission angle of the light bar. The compatibility between the emission angle of the light bar and the emission angle of the display panel is increased, thereby increasing the overall display effect of the display screen.

BRIEF DESCRIPTION OF THE DRAWINGS

In order to explain the technical solutions in the embodiments of the present disclosure more clearly, the following will briefly introduce the drawings that need to be used in the embodiments. Obviously, the drawings in the following description are only some embodiments of the present disclosure, for those of ordinary skill in the art, other drawings can be obtained based on these drawings without creative labor.

REFERENCE CHARACTER

Figure 1:
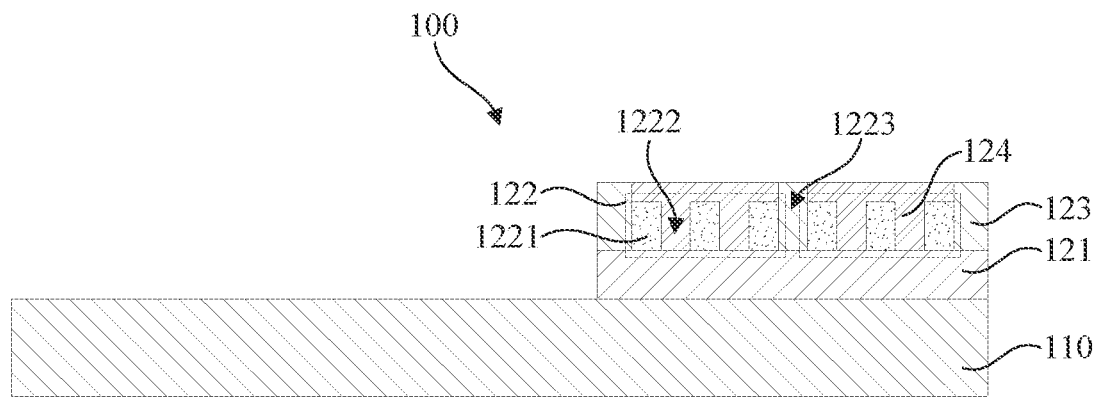
FIG. 1 is a structural diagram of a display screen provided by an embodiment of the present disclosure.

| Label number | Element | Label number | Element |
| --- | --- | --- | --- |
| 10 | Display device | 1223 | Second gap |
| 100 | Display screen | 123 | Reflecting wall |
| 110 | Display panel | 1231 | Second trench |
| 111 | Splicing slit | 1232 | Third gap |
| 120 | Light bar | 124 | Transparent layer |
| 121 | Array substrate | 1241 | First trench |
| 122 | Light emitting unit | 200 | Control circuit |
| 1221 | Light emitting element | 300 | Housing |
| 1222 | First gap | | |

DETAILED DESCRIPTION

The following will clearly and completely describe the technical solutions in the embodiments of the present disclosure with reference to the drawings in the embodiments of the present disclosure. Obviously, the described embodiments are only a part of the embodiments of the present disclosure, rather than all the embodiments. Based on the embodiments in this application, all other embodiments obtained by those skilled in the art without creative work shall fall within the protection scope of this application. In addition, it should be understood that the specific implementations described here are only used to illustrate and explain the application, and are not used to limit the application. In this application, unless otherwise stated, the directional words used such as "upper" and "lower" generally refer to the upper and lower directions of the device in actual use or working state, and specifically refer to the drawing directions in the drawings; and "inner" and "outer" refer to the outline of the device.

An embodiment of the present disclosure is to provide a display screen, a display device, and a method for manufacturing the display screen. These are described in detail below. It should be noted that, the order of description of the following embodiments is not a limitation on the preferred order of the embodiments.

Figure 2:
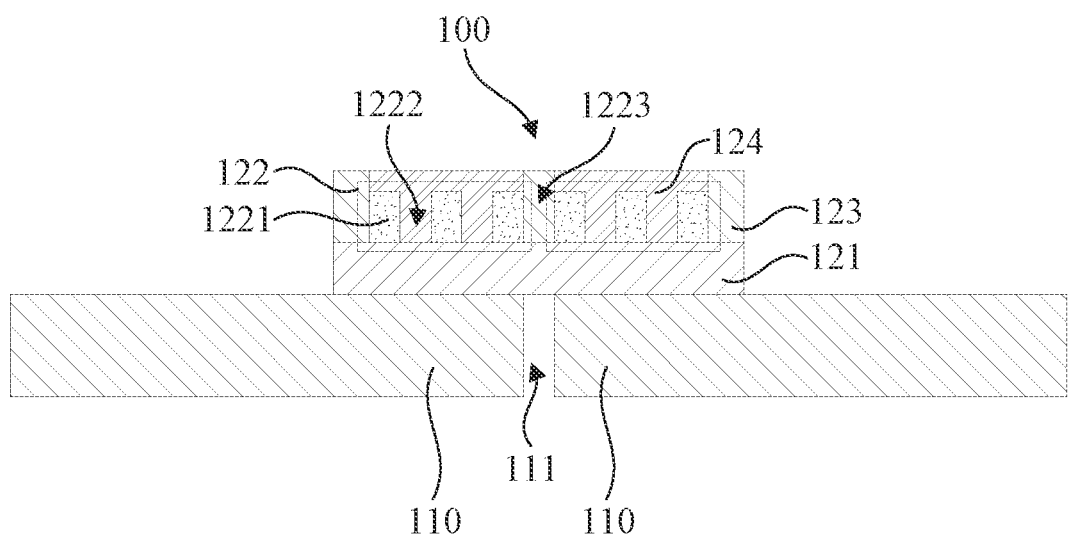
FIG. 2 is a structural diagram of another display screen provided by an embodiment of the present disclosure.

First, an embodiment of the present disclosure provides a display screen. As shown in FIG. 1 and FIG. 2, the display screen 100 comprises a display panel 110. As the main display element of the display screen 100, the display panel 110 directly affects the display effect of the display screen 100. By controlling the display mode of the display panel 110, different display requirements can be meet.

The display screen 100 further comprises a light bar 120. The light bar 120 is attached on a display surface of the display panel 110. Since the display panel 110 includes a display area and a non-display area, black lines will appear at the position corresponding to the non-display area on the display screen 100 during the use of the display screen 100, thereby affecting the display effect of the display screen 100. By attaching the light bar 120 to the non-display area on the display surface of the display panel 110, the luminous display of the light bar 120 can effectively make up for the displayed picture in the non-display area to ensure the display integrity of the whole display screen 100.

The light bar 120 can be attached to the display panel 110 by sticking, so that the attachment position of the light bar 120 can be adjusted according to the setting position of the non-display area on the display panel 110, thereby making the combination mode between the light bar 120 and the display panel 110 more flexible and diverse.

Optionally, the light bar 120 comprises an array substrate 121. The array substrate 121 includes a base substrate and a thin film transistor layer arranged in sequence. The base substrate is used to support other film structures in the light bar 120, and the thin film transistor layer is used as a switch to regulate the luminescence status of the light bar 120 to meet different luminous requirements.

The light bar 120 further comprises a plurality of light emitting elements 1221. The light emitting elements 1221 are arranged on the array substrate 121 in parallel, and a first gap 1222 is provided between two adjacent light emitting elements 1221. The thin film transistor layer includes a plurality of thin film transistors, and a plurality of light emitting elements 1221 are electrically connected one by one with a plurality of thin film transistors. By controlling the switch of the thin film transistors, the luminescence status of single light emitting element 1221 can be adjusted, thereby achieving the regulation of the displayed picture of the whole light bar 120.

Optionally, the light bar 120 further comprises a reflecting wall 123 arranged on the array substrate 121. The reflecting wall 123 is arranged in the first gap 1222 between at least two adjacent light emitting elements 1221. By arranging the reflecting wall 123 in the first gap 1222, the side light from the adjacent light emitting elements 1221 can be reflected, so that the luminous direction of the corresponding light emitting elements 1221 is mainly upward, thereby reducing the emission angle of the light bar 120. Thus, the emission angle between the light bar 120 and the display panel 110 is more compatible, thereby increasing the overall display effect of the display screen 100.

It should be noted that, when the reflecting wall 123 is set in the first gap 1222, the reflecting wall 123 can be in direct contact with the adjacent light emitting elements 1221, that is, the reflecting wall 123 fills the first gap 1222 to block the light emitted from the side of the light emitting elements 1221. Alternatively, a gap is left between the reflecting wall 123 and the adjacent light emitting elements 1221, that is, the reflecting wall 123 is spaced from the adjacent light emitting elements 1221, and other film layers can be filled in the gap. Accordingly, the side light from the light emitting elements 1221 can be reflected upwards by the reflecting wall 123 so that the luminous direction of the corresponding light emitting elements 1221 is mainly upward, raising the light-emitting rate of the light-emitting element 1221.

In the embodiment of the present disclosure, the display screen 100 comprises a display panel 110 and a light bar 120. The light bar 120 is attached to the display surface of the display panel 110. The light bar 120 comprises an array substrate 121 and a plurality of light emitting elements 1221 arranged on the array substrate 121 in parallel, and a first gap 1222 is provided between two adjacent light emitting elements 1221. The light bar 120 further comprises a reflecting wall 123 arranged on the array substrate 121, and the reflecting wall 123 is arranged in the first gap 1222 between at least two adjacent light emitting elements 1221. By arranging the reflecting wall 123 in the first gap 1222 between any two adjacent light emitting elements 1221, the side light of the light emitting elements 1221 can be reflected upwards. Thus, the emission angle of the whole light bar 120 is reduced. The compatibility between the emission angle of the light bar 120 and the emission angle of the display panel 110 is increased, thereby improving the overall display effect of the display screen 100.

Optionally, the display screen 100 comprises at least two display panels 110, and a splicing slit 111 is provided between the two display panels 110. By splicing the display panel 110, it can avoid the increase of manufacturing difficulty caused by the excessive size of a single display panel 110. At the same time, the splicing of the display panels 110 can also meet the different requirements of the display screen 100 for size, shape, display effect, etc., so as to expand the application range of the display screen 100.

The display screen 100 can be spliced by only two display panels 110, that is, one edge of each of the two display panels 110 can be spliced together. The display screen 100 may also include a plurality of display panels 110 spliced together. When multiple display panels 110 are spliced, either a splicing way of parallel arrangement in one direction or a splicing way of array arrangement can be adopted. The number of the display panels 110 of the display screen 100 and the splicing way can be adjusted according to the actual design requirements, and there are no special restrictions here.

Since the display panels 110 are spliced, no matter they are assembled with connecting elements or directly bonded, a splicing slit 111 is formed between the two spliced display panels 110. The size of the splicing slit 111 is directly related to the manufacturing accuracy of the display panel 110 and the selection of the splicing method. At the same time, the generation of the splicing slit 111 will also directly affect the display effect of the display screen 100.

The light bar 120 covers the splicing slit 111 between the display panels 110. Since the splicing slit 111 cannot perform luminous display, black lines will appear on the displayed picture during the use of the display screen 100, thereby affecting the display effect of the display screen 100. By arranging the light bar 120, the luminous display of the light bar 120 can effectively make up for the displayed picture at the splicing slit 111, so as to ensure the display integrity of the whole display screen 100.

It should be noted that, when the display screen 100 comprises a plurality of display panels 110, the light bar 120 covers the splicing slit 111 between any two adjacent display panels 110 to make up for the displayed picture at any splicing slit 111, so as to ensure the display integrity of the whole display screen 100.

Alternatively, a reflecting wall 123 is arranged in the first gap 1222 between any two adjacent light emitting elements 1221. That is, a reflecting wall 123 is arranged around each of the light emitting elements 1221, so as to reflect the side light of each of the light emitting elements 1221 upwards. Further, the emission angle of the whole light bar 120 is reduced. The compatibility between the emission angle of the light bar 120 and the emission angle of the display panel 110 is increased, thereby improving the overall display effect of the display screen 100.

It should be noted that, in addition to the first gap 1222 between the adjacent light emitting elements 1221, a reflecting wall 123 is also arranged around the light emitting elements 1221 at the edge of the light bar 120. That is, the edge of the light bar 120 is provided with the reflecting wall 123 to reflect the light emitted from any side of the light emitting elements 1221, so as to avoid the influence of the light emitting elements 1221 at the edge of the light bar 120 on the emission angle of the whole light bar 120.

Alternatively, the light bar 120 comprises a plurality of light emitting units 122, each of the light emitting units 122 comprises a plurality of light emitting elements 1221. That is, the light emitting units 122 correspond to the luminous pixels of the light bar 120, and the light emitting elements 1221 correspond to the sub luminous pixels of the light bar 120. By the mutual cooperation of different sub luminous pixels, the luminous efficiency of each of the luminous pixels in the light bar 120 can be adjusted, so as to achieve different luminous requirements of the light bar 120.

In some embodiments, the light emitting unit 122 includes three light emitting elements 1221. The luminous colors of the three light emitting elements 1221 are different, and are respectively red, green, and blue. By the mutual cooperation of the three light emitting elements 1221, the overall luminous color of the light emitting unit 122 can be adjusted.

In other embodiments, the light emitting elements 1221 included in the light emitting unit 122 are the same color. That is, the light emitting unit 122 is monochrome display. Alternatively, the light emitting unit 122 includes light emitting elements 1221 in two colors, and the colors of a plurality of light emitting elements 1221 respectively in the adjacent light emitting units 122 are different, so as to meet the different luminous requirements of the light bar 120. The number of light emitting elements 1221 contained in each of the light emitting units 122 and the color of each of the light emitting elements 1221 can be adjusted according to the actual design requirements, and there are no special restrictions here.

Alternatively, a second gap 1223 is provided between two adjacent light emitting units 122. That is, the second gap 1223 serves as the dividing line of each of the light emitting unit 122 so as to divide a plurality of light emitting elements 1221 into a plurality of light emitting units 122. By dividing the light emitting elements 1221 into the light emitting unit 122, the light emitted by the light emitting elements 1221 in one light emitting unit 122 can be mixed first, and then mixed with the light emitted by other light emitting units 122, so as to meet the different luminous requirements of the light bar 120.

The second gap 1223 between at least two adjacent light emitting units 122 is provided with the reflecting wall 123, so as to achieve the purpose of setting the reflecting wall 123 in the first gap 1222 between at least two adjacent light emitting elements 1221. That is, the second gap 1223 is a part of the plurality of first gaps 1222. The side light of the light emitting units 122 is reflected upwards by the reflecting wall 123, so that the overall luminous direction of the corresponding light emitting units 122 is mainly upward, thereby reducing the emission angle of the light bar 120. Thus, the emission angle between the light bar 120 and the display panel 110 is more compatible, thereby increasing the overall display effect of the display screen 100.

Optionally, the reflecting wall 123 is arranged in the second gap 1223 between any two adjacent light emitting units 122. That is, the reflecting wall 123 is disposed around each of the light emitting units 122, so as to reflect the side light of each of the light emitting elements 1221 upwards. Further, the emission angle of the whole light bar 120 is reduced. The compatibility between the emission angle of the light bar 120 and the emission angle of the display panel 110 is increased, thereby improving the overall display effect of the display screen 100.

When the reflecting wall 123 is provided on the array substrate 121, the height of the reflecting wall 123 relative to the array substrate 121 directly affects the reflection of the reflecting wall 123 on the light emitted from the side of the corresponding light-emitting element 1221 or the light-emitting unit 122, thereby affecting the compatibility between the emission angle of the light bar 120 and the emission angle of the display panel 110.

Optionally, the height of the reflecting wall 123 in relative to the array substrate 121 is greater than the height of the light emitting element 1221 in relative to the array substrate 121. This structural design enables the reflecting wall 123 to partially reflect the light emitted from the surface of the light-emitting element 1221, and further reduces the light-emitting angle of the light-emitting element 1221, so as to achieve the compatibility between the emission angle of the light bar 120 and the emission angle of the display panel 110 and improve the overall display effect of the display screen 100.

The height difference between the reflecting wall 123 and the light emitting element 1221 is greater than or equal to 30% of the height of the light emitting element 1221. If the height of the reflecting wall 123 in relative to the array substrate 121 is too low, the light with a larger light-emitting angle on the surface of the light-emitting element 1221 cannot be effectively reflected, and the light-emitting angle of the light-emitting element 1221 cannot be effectively reduced. The difference between the light-emitting angle of the light bar 120 and the light-emitting angle of the display panel 110 is still large, which ultimately affects the display effect of the display screen 100.

The height difference between the reflecting wall 123 and the light emitting element 1221 is less than or equal to 50% of the height of the light emitting element 1221. If the height of the reflecting wall 123 in relative to the array substrate 121 is too high, the light emitted from the surface of the light emitting element 1221 will be excessively reflected, resulting in the excessive reduction of the emission angle of the light emitting element 1221. As a result, the overall emission angle of the light bar 120 is smaller than the emission angle of the display panel 110, the display effect of the display screen 100 is finally affected.

In the actual manufacturing process, the height difference between the reflecting wall 123 and the light emitting element 1221 is set to 30%, 35%, 40%, 45% or 50% of the height of the light emitting element 1221, which can not only ensure that the light emitted from the surface of the light emitting element 1221 is reflected upwards, but also avoid excessive reflection of the light emitted from the surface of the light emitting element 1221. Thus, the compatibility between the overall emission angle of the light bar 120 and the emission angle of the display panel 110 is ensured, and the purpose of improving the overall display effect of the display screen 100 is realized.

Figure 10:
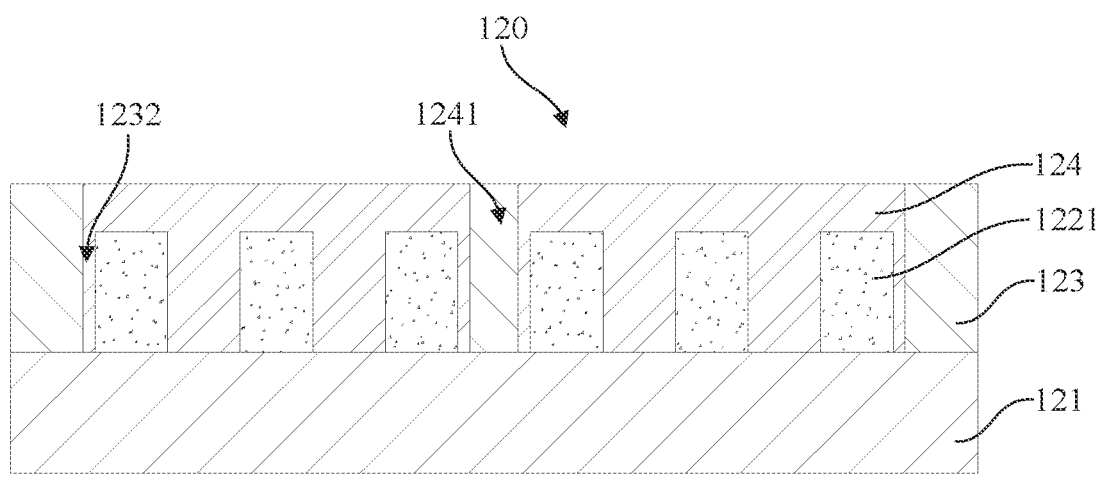
FIG. 10 is a structural diagram of yet another light bar provided by an embodiment of the present disclosure.

Alternatively, as shown in FIG. 10, in the embodiment of the present disclosure, a third gap 1232 is provided between the reflecting wall 123 and the adjacent light emitting elements 1221. That is, the reflecting wall 123 is spaced from the adjacent light emitting elements 1221. This structural design makes the light emitted from the side of the light emitting elements 1221 to be reflected upwards by the reflecting wall 123 to raise overall light output rate of the light-emitting element 1221.

The width of the third gap 1232 is less than or equal to 35% of the width of the first gap 1222 between two adjacent light emitting elements 1221. That is, the width of the reflecting wall 123 is greater than or equal to 30% of the width of the first gap 1222. If the width of the third gap 1232 is too large, the light absorption layer 123 cannot effectively absorb the light emitted from the side of the adjacent light emitting elements 1221, thereby failing to effectively reduce the emission angle of the light emitting element 1221.

Further, the width of the third gap 1232 is greater than or equal to 15% of the width of the first gap 1222 between two adjacent light emitting elements 1221. That is, the width of the reflecting wall 123 is less than or equal to 70% of the width of the first gap 1222. If the width of the third gap 1232 is too small, the reflecting wall 123 will over absorb the light emitted from the side of the adjacent light emitting elements 1221, resulting in an excessively small emission angle of the light emitting element 1221.

In the actual manufacturing process, the width of the third gap 1232 is set to be 15%, 20%, 25%, 30% or 35% of the width of the first gap 1222 between two adjacent light emitting elements 1221, which can not only ensure the effective reflection of the light emitted from the side of the light emitting elements 1221 by the reflecting wall 123, but also avoid the excessive reflection of the light emitted from the side of the light emitting elements 1221 by the reflecting wall 123. Thus, the compatibility of the luminous effect between the light bar 120 and the display panel 110 is improved.

Alternatively, by setting a reflecting wall 123 in the first gap 1222 between two adjacent light emitting elements 1221 to reflect the light emitted from the side of the light emitting elements 1221, and to reduce the emission angle of the light emitting element 1221, the emission angle of the light bar 120 in the embodiment of the present disclosure is less than or equal to 120°. Since the emission angle of the liquid crystal display panel 110 is close to 100°, setting the emission angle of the light bar 120 within 120° can ensure the basic compatibility of the emission angle of the light bar 120 and the emission angle of the display panel 110, so as to improve the display effect of the display screen 100.

In the actual production process, the emission angle of the light bar 120 can be set to 95°, 100°, 105°, 110°, or 120°, and the specific difference can be adjusted according to the design requirements, as long as the emission angle of the light bar 120 and the emission angle of the display panel 110 meet the display requirements of the display screen 100.

In order to further define the relationship between the emission angle of the light bar 120 and the emission angle of the display panel 110 to meet the requirements of the overall display effect of the display screen 100, the difference between the emission angle of the light bar 120 and the emission angle of the display panel 110 in this embodiment is less than or equal to 20°. That is, the difference between the unilateral emission angle of the light bar 120 and the unilateral emission angle of the display panel 110 is 10°. Within this difference range, the overall display screen of the display screen 100 observed by the personnel has no obvious abnormality, which can meet the display requirements of the display screen 100.

In the actual production process, the difference between the emission angle of the light bar 120 and the emission angle of the display panel 110 can be set to 2°, 5°, 10°, 15°, or 20°. The specific difference can be adjusted according to the design requirements, as long as the emission angle of the light bar 120 and the emission angle of the display panel 110 meet the display requirements of the display screen 100.

Alternatively, in the embodiment of the present disclosure, the light bar 120 further comprises a light transparent layer 124 located on a plurality of light emitting elements 1221. On one hand, the arrangement of the light transparent layer 124 can encapsulate and protect a plurality of light emitting elements 1221 to avoid erosion of the light emitting elements 1221 by oxygen or moisture in the air; on the other hand, while ensuring the normal luminescence of the surface of the light emitting elements 1221, the surface of the reflecting wall 123 and a plurality of light emitting elements 1221 can also be flattened to improve the overall beauty of the light bar 120.

The material used by the light transparent layer 124 includes one or more of silica gel, epoxy resin, or silicone resin, and it can also be any other material that can meet the requirements. It is only necessary to ensure that light transparent layer 124 encapsulates and protects the light emitting elements 1221 without affecting the normal luminescence of the light emitting elements 1221.

Furthermore, an embodiment of the present discourse also provides a display device. The display device comprises a display screen. The specific structure of the display screen refers to the above embodiments. Since the display device adopts all the technical solutions of all the above embodiments, it has at least all the beneficial effects brought by the technical solutions of the above embodiment. It will not repeat them here.

Figure 3:
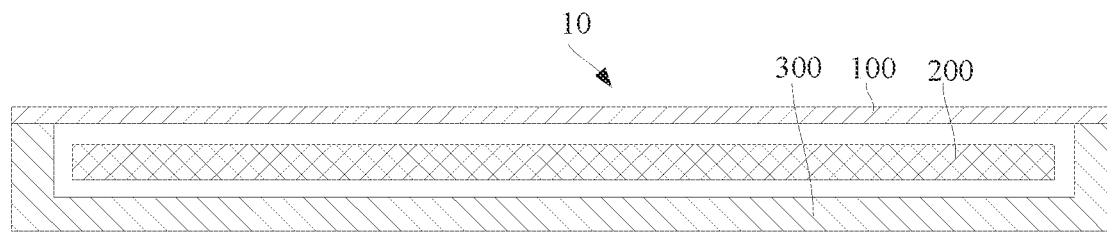
FIG. 3 is a structural diagram of a display device provided by an embodiment of the present disclosure.

FIG. 3 is a structural diagram of a display device provided by the embodiment of the present disclosure. As shown in FIG. 3, the display device 10 includes a display screen 100, a control circuit 200 and a housing 300. The housing 300 is connected with the display screen 100 to support and fix the display screen 100. The control circuit 200 is arranged in the housing 300, and the control circuit 200 is electrically connected with the display screen 100 to control the display screen 100 for screen display.

The display screen 100 can be fixed to the housing 300 to form a whole with the housing 300, and the display screen 100 and the housing 300 form a closed space to accommodate the control circuit 200. The control circuit 200 can be the main board of the display device 10. At the same time, the control circuit 200 can also be integrated with one or more of the functional components such as battery, antenna structure, microphone, speaker, headset interface, universal serial bus interface, camera, distance sensor, ambient light sensor, receiver, and processor, so as to make the display device 10 be adapted to various application fields.

It should be noted that, the display device 10 is not limited to the above contents, but can also include other devices, such as camera, antenna structure, fingerprint unlocking module, etc., so as to expand its scope of use, which is not limited here. The display device in the embodiment has a wide range of applications, including flexible display and lighting such as TV, computer, foldable and crimp able display 100, etc., which are within the application field of the display device 10 in the embodiment of the application.

Figure 4:
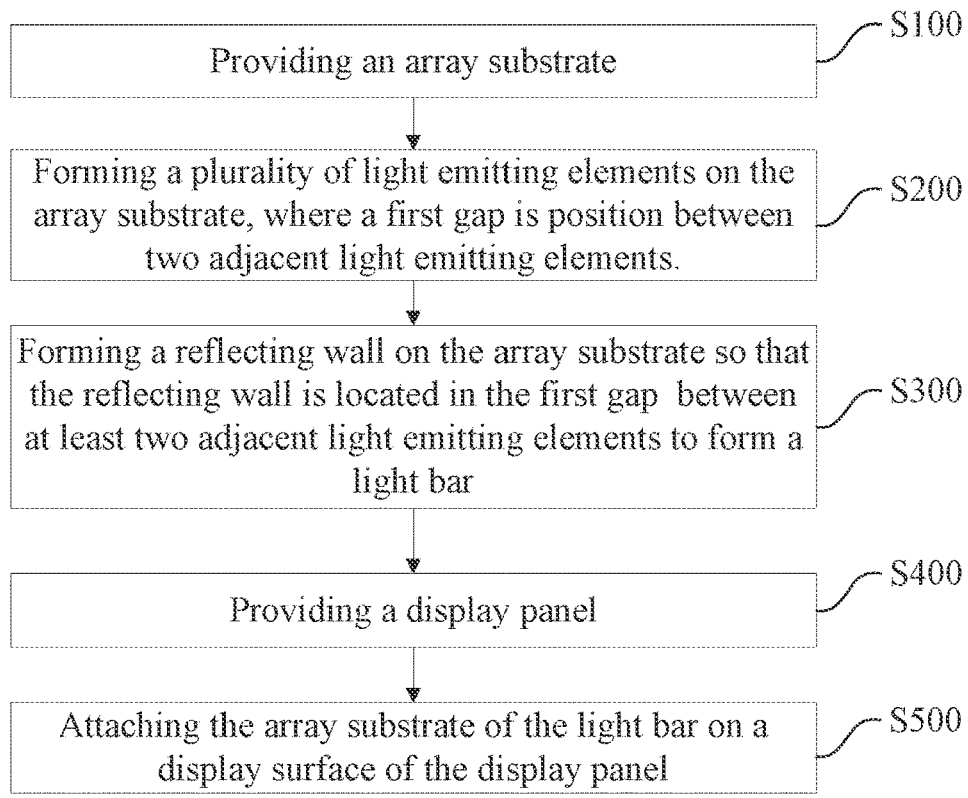
FIG. 4 is a flow chart of a method for manufacturing a display screen provided by an embodiment of the present disclosure.

Finally, an embodiment of the present disclosure also provides a method for manufacturing the display screen. As shown in FIG. 4, the method for manufacturing the display screen 100 mainly includes the following steps:

S100, providing an array substrate 121. The array substrate 121 includes a base substrate and a thin film transistor layer arranged in turn. The base substrate is used to support other film structures in the light bar 120, and the thin film transistor layer is used as a switch to regulate the luminescence status of the light bar 120 to meet different luminous requirements.

S200, forming a plurality of light emitting elements 1221 on the array substrate 121, and providing a first gap 1222 between two adjacent light emitting elements 1221.

Figure 5:
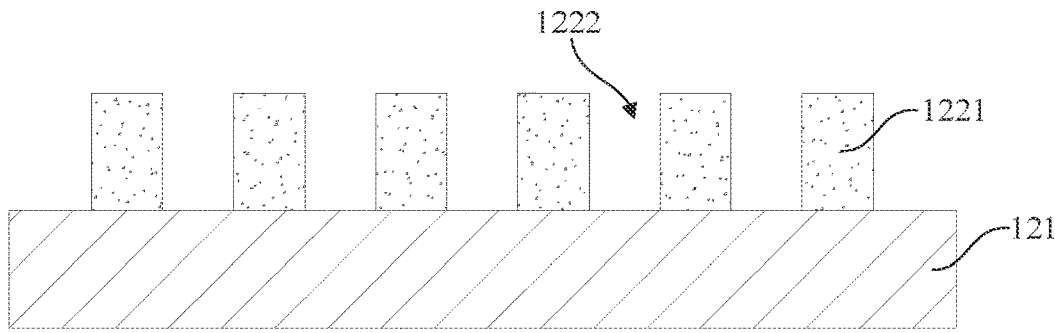
FIG. 5 is a structural diagram of the step of S200 in FIG. 3 provided by an embodiment of the present disclosure.

As shown in FIG. 5, the thin film transistor layer includes a plurality of thin film transistors, and a plurality of light emitting elements 1221 are electrically connected one by one with a plurality of thin film transistors. By controlling the switch of the thin film transistors, the luminescence status of single light emitting element 1221 can be adjusted, thereby achieving the regulation of the displayed picture of the whole light bar 120.

When the light emitting element 1221 is transferred to the array substrate 121, a first gap 1222 is provided between two adjacent light emitting elements 1221. On one hand, the setting of the first gap 1222 is convenient for adjusting the arrangement of the plurality of light emitting elements 1221. On the other hand, it is also conducive to the electrical connection between the light emitting elements 1221 and the corresponding thin film transistors, the mutual crosstalk between the adjacent light emitting elements 1221 is avoided.

S300, coating a reflecting wall 123 on the array substrate 121 so that the reflecting wall 123 is located in the first gap 1222 between at least two adjacent light emitting elements 1221 to form a light bar 120.

Figure 6:
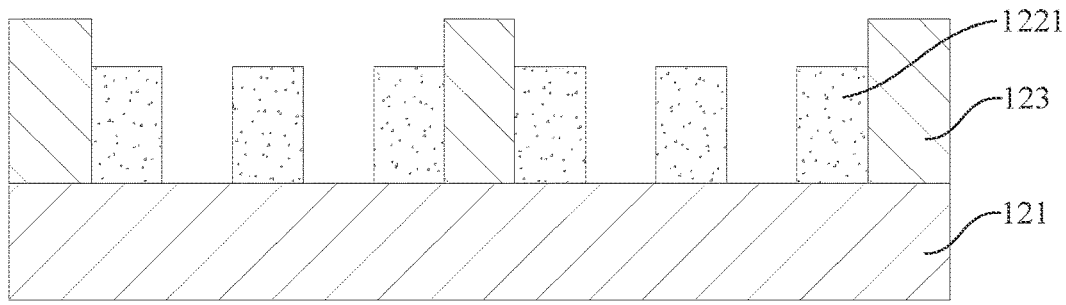
FIG. 6 is a structural diagram of the step of S300 in FIG. 3 provided by an embodiment of the present disclosure.
Figure 7:
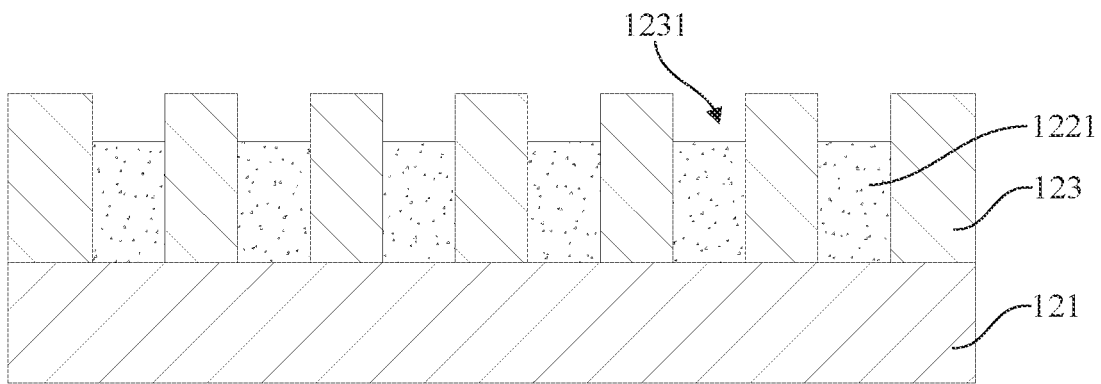
FIG. 7 is another structural diagram of the step of S300 in FIG. 3 provided by an embodiment of the present disclosure.

As shown in FIG. 6 and FIG. 7, after transferring the plurality of light emitting elements 1221 to the array substrate 121, a reflecting wall 123 needs to be formed in the first gap 1222 between at least two adjacent light emitting elements 1221. The array substrate 121, the plurality of light emitting elements 1221, and the reflecting wall 123 constitute the light bar 120 together. By setting the reflecting wall 123, the light emitted from the side of the corresponding light emitting elements 1221 can be reflected, and the emission angle of the light emitting elements 1221 can be reduced, so as to reduce the emission angle of the whole light bar 120.

In some embodiments, the step S300 of forming a reflecting wall 123 on the array substrate 121 includes the following steps:

First, a transparent layer 124 is coated on the array substrate 121 and the plurality of light emitting elements 1221. The transparent layer 124 at an area aligning the first gap 1241 is etched to form a first trench 1222. The reflecting wall 123 is formed on the first trench 1222.

Figure 8:
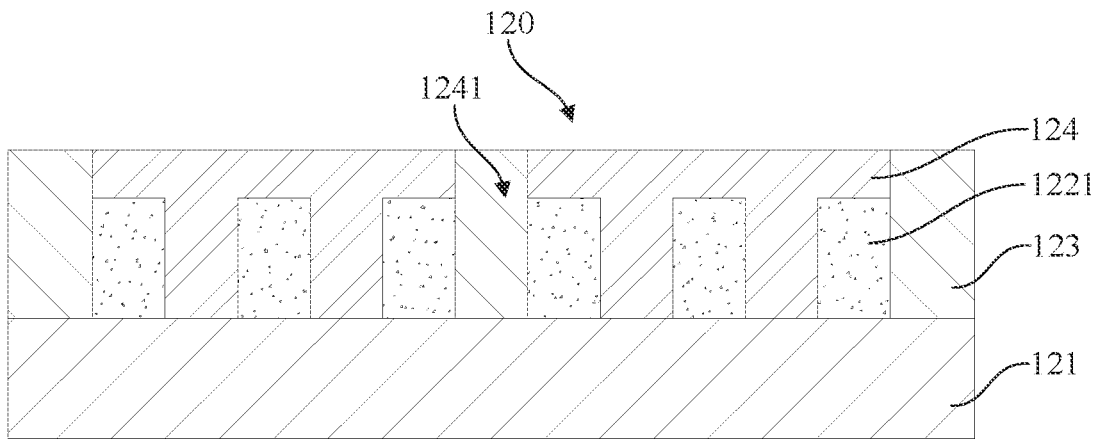
FIG. 8 is a structural diagram of a light bar provided by an embodiment of the present disclosure.

Specifically, as shown in FIGS. 6 and 8, during the step of forming the reflecting wall 123, the array substrate 121 and the light emitting elements 1221 are coated with a transparent layer 124. The transparent layer 124 is used to encapsulate and protect the array substrate 121 and the multiple light-emitting elements 1221. The transparent layer 124 can also planarize the surface of the multiple light-emitting elements 1221. After the transparent layer 124 is cured and formed, the position on the transparent layer 124 corresponding to the first gap 1222 is etched by plasma or laser to form the first trench 1241. Then, the reflecting wall 123 is formed in the first trench 1241 so that the reflecting wall 123 is located in the first gap 1222 between the two adjacent light-emitting elements 1221. The reflecting wall 123 is used to reflect the light emitted from the side of the light emitting element 1221, so that the main light emitting direction of the light emitting element 1221 faces above the light emitting element 1221, and the light emitting angle of the light emitting element 1221 is reduced.

By means of forming the transparent layer 124, and then forming the reflecting wall 123 on the first trench 1241 defined on the transparent layer 124, it is convenient for adjusting the position of the reflecting wall 123. In addition, the light-emitting elements 1221 are effectively packaged by the transparent layer 124 to improve the stability of the light bar 120.

When the reflecting wall 123 is provided in the first gap 1222 between any two adjacent light-emitting elements 1221, it is necessary to generate a plurality of first trenches 1241 on the transparent layer 124, so that the first trenches 1241 and the first gap 1222 has a one-to-one correspondence. The reflecting wall 123 is formed on each first trench 1241. When only part of the first gap 1222 between two adjacent light-emitting elements 1221 is provided with the reflecting wall 123, it is only necessary to etch the transparent layer 124 corresponding to the location where the reflecting wall 123 is set, and other transparent layer 124 in the first gap 1222 remains. In the actual manufacturing process, the position of the first trench 1241 can be adjusted correspondingly according to the position of the reflecting wall 123.

When the transparent layer 124 is processed, the position of the light-transmitting layer 124 corresponding to the first gap 1222 can be partially etched. That is, the depth of the first trench 1241 is smaller than the depth of the first gap 1222. In order to further improve the reflection effect of the reflecting wall 123 on the side of the light emitting element 1221, not only the transparent layer 124 is etched, but part of the array substrate 121 (even part of the film layer of the array substrate 121) is etched to increase the depth of the first trench 1241. Its specific structure can be adjusted according to actual design requirements.

In another embodiment, the step of forming the reflecting wall on the array substrate comprises the following operations.

First, the reflecting wall 123 is formed on the array substrate 121 and the light emitting elements 1221. A part of the reflecting wall 123 is etched in a position corresponding to the light emitting element 1221 to form a second trench 1231 exposing the light emitting element 1221. The transparent layer 124 is formed on the second trench 1231.

Figure 9:
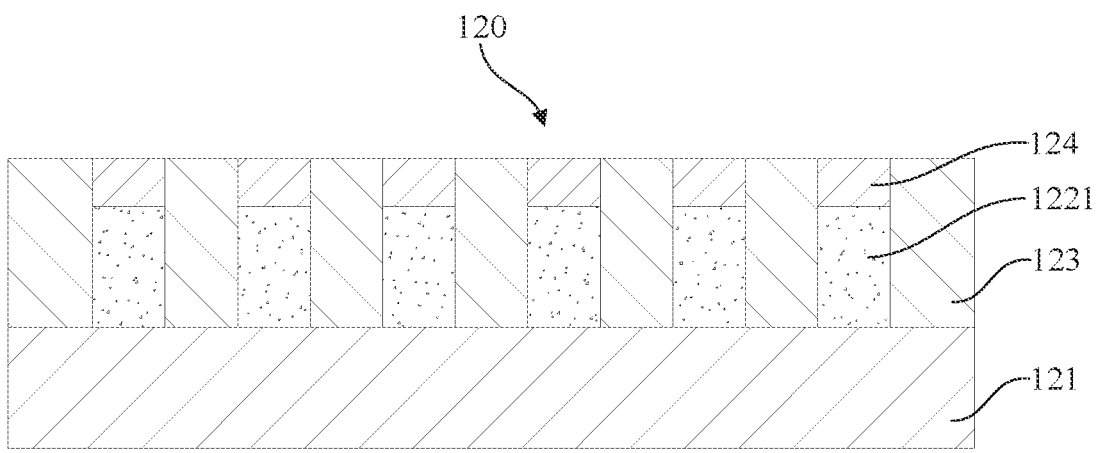
FIG. 9 is a structural diagram of another light bar provided by an embodiment of the present disclosure.

Specifically, as shown in FIG. 7 and FIG. 9, during the step of forming the reflecting wall 123, the array substrate 121 and the light emitting elements 1221 are coated to form the reflecting wall 123. After the reflecting wall 123 is cured, the reflecting wall 123 in a position corresponding to the light emitting element 1221 is etched by plasma or laser, so as to expose the light emitting element 1221. That is, a plurality of second trenches 1231 are arranged on the reflecting wall 123 corresponding to the light emitting elements 1221. Then, the transparent layer 124 is formed in the second trench 1231 to encapsulate and protect the light-emitting elements 1221. The reflecting wall 123 and the surface of the light-emitting elements 1221 can be covered and planarized by the transparent layer 124.

The embodiment of the present disclosure adopts a manufacturing method in which the reflecting wall 123 is formed first, and then the light-transmitting layer 124 is formed in the second trench 1231 on the reflecting wall 123, so that the light-emitting element 1221 only emits light through the surface upward, which is beneficial for further reduction. The light-emitting angle of the light-emitting element 1221 is small, and the light-emitting utilization rate of the light-emitting element 1221 is improved.

When the reflecting wall 123 is formed in this way, in the process of etching the reflecting wall 123 to form the second trench 1231, it is necessary to ensure that the second trench 1231 leaks out of the entire surface of the light-emitting element 1221 to avoid a residue of the reflecting wall 123 affecting the luminous effect of the light-emitting element 1221.

Additionally, in order to avoid that the remaining reflecting wall 123 is too high and the light emitted from the surface of the light-emitting element 1221 is over-reflected, causing the light-emitting angle of the light-emitting element 1221 to be too small, or the remaining reflecting wall 123 is too low so that the light from the surface of the light-emitting element 1221 cannot be effectively reflected and cause the light emitting angle of the element 1221 is too large, when forming the reflecting wall 123, the coating height of the reflecting wall 123 needs to be controlled. The difference between the height of the reflecting wall 123 relative to the array substrate 121 and the height of the light-emitting element 1221 relative to the array substrate 121 is less than or equal to 50% of the height of the light-emitting element 1221. Also, the difference between the height of the reflecting wall 123 relative to the array substrate 121 and the height of the light-emitting element 1221 relative to the array substrate 121 is greater than or equal to 30% of the height of the light-emitting element 1221. The design requirements of the light-emitting angle of the element 1221.

S400, providing a display panel 110. As the main display element of the display screen 100, the display panel 110 directly affects the display effect of the display screen 100. Different display requirements can be realized by controlling the display mode of the display panel 110.

Before using the light bar 120 with the display panel 110, at least two display panels 110 can be spliced according to the actual use. The number of the display panels 110 and the splicing mode of display panels 110 can be adjusted according to the design situation.

Since the display panel 110 is formed by splicing, no matter it is assembled with connecting elements or directly bonded, a splicing slit 111 is provided between the two spliced display panels 110. The size of the splicing slit 111 is directly related to the manufacturing accuracy of the display panel 110 and the selection of the splicing method. At the same time, the generation of the splicing slit 111 will also directly affect the display effect of the display screen 100.

S500, attaching the array substrate 121 of the light bar 120 on a display surface of the display panel 110.

Since the display panel 110 includes a display area and a non-display area, black lines will appear at the position corresponding to the non-display area on the display screen 100 during the use of the display screen 100, thereby affecting the display effect of the display screen 100. By attaching the light bar 120 to the non-display area on the display surface of the display panel 110, the luminous display of the light bar 120 can effectively make up for the displayed picture of the non-display area to ensure the display integrity of the whole display screen 100.

When at least two display panels 110 are spliced together, the luminous display cannot be performed at the splicing slit 111 between the two display panels 110. During the use of the display screen 100, black lines will appear on the displayed picture, thereby affecting the display effect of the display screen 100. After completing the production of the light bar 120 and the preparation of the display panel 110, it is necessary to attach the light bar 120 to the display surface of the display panel 110 and cover the splicing slit 111 between the display panels 110 to compensate the display screen at the splicing slit 111 and ensure the display integrity of the whole display screen 100.

In the manufacturing process of the display screen 100, the embodiment of the present disclosure forms a reflecting wall 123 in the first gap 1222 between two adjacent light emitting elements 1221 to absorb the light emitted from the side of the light emitting element 1221, so as to reduce the emission angle of the light emitting element 1221, and then reduce the emission angle of the whole light bar 120. After the light bar 120 is attached to the display surface of the display panel 110, it can not only compensate the displayed picture of the non-display area on the display panel 110, but also ensure the compatibility between the emission angle of the light bar 120 and the emission angle of the display panel 110, so as to further improve the display effect of the display screen 100.

The above embodiment of this invention offers a display screen, a display device, and a method for manufacturing the display screen in the herein application specific exception to the principle of the invention and embodiments have discussed, more embodiment of is only used to help to understand the description of the method of the present invention and its core idea; at the same time, for the general technical personnel in this field, according to the idea of the invention, the specific embodiment and application range at will a change, in sum, the contents of this specification should not be understood to limit the present invention.

What is claimed is:
1. A display screen, comprising:
   a display panel; and
   a light bar attached on a display surface of the display panel, comprising:
      an array substrate;
      a plurality of light emitting elements arranged on the array substrate; and
      a reflecting wall, arranged on the array substrate and positioned in a first gap between two adjacent light emitting elements,
      wherein the display screen comprises at least two display panels, a splicing slit exists between the two display panels, and the light bar covers the splicing slit.

2. The display screen of claim 1, wherein the display screen comprises a plurality of display panels, and the light bar covers the splicing slit between any two adjacent display panels.

3. The display screen of claim 1, wherein the reflecting wall is arranged in the first gap between any two adjacent light emitting elements.

4. The display screen of claim 1, wherein the reflecting wall is disposed on an edge of the light bar.

5. The display screen of claim 1, wherein the light bar comprises a plurality of light emitting units, each of the light emitting units comprises a number of the light emitting elements, and a second gap is provided between two adjacent light emitting units; and wherein the reflecting wall is arranged in the second gap between at least two adjacent light emitting units.

6. The display screen of claim 5, wherein the reflecting wall is arranged in the second gap between any two adjacent light emitting units.

7. The display screen of claim 1, wherein a height of the reflecting wall in relative to the array substrate is greater than a height of the light emitting element in relative to the array substrate.

8. The display screen of claim 7, wherein a height difference between the reflecting wall and the light emitting element is greater than or equals to 30% of the height of the light emitting element; a height difference between the reflecting wall and the light emitting element is less than or equal to 50% of a height of the light emitting element.

9. The display screen of claim 1, wherein a third gap is provided between the reflecting wall and the adjacent light emitting element, and a width of the third gap is less than or equal to 35% of a width of the first gap; the width of the third gap is greater than or equal to 15% of the width of the first gap.

10. The display screen of claim 1, wherein a refractive index of the reflecting wall is greater than or equals to 1.7.

11. The display screen of claim 1, wherein the reflecting wall is made of metal.

12. The display screen of claim 1, wherein an emission angle of the light bar is less than or equal to 120°.

13. The display screen of claim 1, wherein a difference between an emission angle of the light bar and an emission angle of the display panel is less than or equal to 20°.

14. The display screen of claim 1, wherein the light bar further comprises a light transparent layer, and the light transparent layer is located on the light emitting elements.

15. The display screen of claim 14, wherein a material of the light transparent layer is one or more selected from a group of silica gel, epoxy resin, and silicone resin.

16. A display device comprising the display screen as claimed in claim 1.

17. A method for manufacturing the display screen, comprising:
   providing an array substrate;
   forming a plurality of light emitting elements on the array substrate, wherein a first gap is between two adjacent light emitting elements;
   coating a transparent layer on the array substrate and the plurality of light emitting elements;
   etching the transparent layer at an area aligning the first gap to form a first trench;

forming a reflecting wall on the first trench so that the reflecting wall is located in the first gap between at least two adjacent light emitting elements to form a light bar;

providing a display panel; and attaching the array substrate of the light bar on a display surface of the display panel.

18. A method for manufacturing the display screen, comprising:

providing an array substrate;

forming a plurality of light emitting elements on the array substrate, wherein a first gap is between two adjacent light emitting elements;

forming a reflecting wall on the array substrate and the plurality of light emitting elements;

etching the reflecting wall at an area aligning the plurality of light emitting elements to form a second trench;

forming a transparent layer on the second trench so that the reflecting wall is located in the first gap between at least two adjacent light emitting elements to form a light bar;

providing a display panel; and attaching the array substrate of the light bar on a display surface of the display panel.

\* \* \* \* \*